United States Patent
Grenier et al.

(10) Patent No.: US 6,481,914 B1
(45) Date of Patent: Nov. 19, 2002

(54) RADIOGRAPHIC SOURCE CONNECTOR WITH IMPROVED COUPLING MECHANISM

(75) Inventors: Steven J. Grenier, Arlington, MA (US); George W. Parsons, No. Reading, MA (US)

(73) Assignee: AEA Technology QSA Inc., Burlington, MA (US)

( * ) Notice: Subject to any disclaimer, the term of this patent is extended or adjusted under 35 U.S.C. 154(b) by 0 days.

(21) Appl. No.: 09/543,920

(22) Filed: Apr. 6, 2000

Related U.S. Application Data

(60) Provisional application No. 60/128,363, filed on Apr. 8, 1999.

(51) Int. Cl.$^7$ ................................................. F16C 11/06
(52) U.S. Cl. ...................... 403/122; 403/143; 403/300; 24/598.1
(58) Field of Search ........................... 403/90, 122, 123, 403/138, 135, 143, 300, 301, 302, 321, 322.1, 325; 24/598.1, 597.1, 598.7, 600.5, 600.7, 600.9, 629, 633

(56) References Cited

U.S. PATENT DOCUMENTS

| | | | |
|---|---|---|---|
| 923,045 A | 5/1909 | Gulick | |
| 1,159,473 A | 11/1915 | Church | |
| 2,031,878 A | 2/1936 | Coutu | |
| 2,255,195 A | * 9/1941 | Tampier | 403/143 X |
| 2,298,642 A | 10/1942 | Tampier | |
| 2,859,060 A | 11/1958 | Davies et al. | |
| 3,129,023 A | 4/1964 | Fierstine | |
| 3,163,445 A | 12/1964 | Kirk et al. | |
| 3,269,760 A | 8/1966 | Seckerson | |
| 3,795,922 A | 3/1974 | Herbert et al. | |
| 3,803,685 A | 4/1974 | Muhn | |
| 4,367,968 A | 1/1983 | Ishida | |
| 4,388,012 A | 6/1983 | Erickson | |
| 4,431,330 A | 2/1984 | Darnell | |
| 4,447,139 A | 5/1984 | Biber | |
| 4,520,546 A | 6/1985 | Darnell | |
| 4,815,883 A | 3/1989 | Takke | |
| 4,974,802 A | 12/1990 | Hendren | |
| 5,065,033 A | 11/1991 | Parsons | |
| 5,090,654 A | 2/1992 | Ridings et al. | |
| 5,280,871 A | 1/1994 | Chuang | |
| 5,372,446 A | 12/1994 | Chamberlin | |
| 5,624,198 A | 4/1997 | Fuchs | |
| 5,806,821 A | 9/1998 | Phillips et al. | |

* cited by examiner

*Primary Examiner*—Greg Binda
*Assistant Examiner*—John R. Cottingham
(74) *Attorney, Agent, or Firm*—Wolf, Greenfield & Sacks, P.C.

(57) ABSTRACT

A coupling mechanism secures a radiographic source connector to a drive assembly to prevent unintentional release. The source connector includes a cup sleeve with a sleeve slot cut along its axis. The sleeve is spring-loaded to capture the ball end of a drive assembly by applying a positive locking force from the spring. The sleeve slot provides clearance for the neck of the ball end of the drive connector ball. This clearance allows the source connector to pivot approximately 90° without detaching from the drive cable at any angle or orientation. The source connector cannot be disconnected from the drive assembly due to a force applied in any direction. The only mechanism for release is to intentionally move the sleeve in a direction opposite the urging of the spring and then remove the drive connector ball.

15 Claims, 7 Drawing Sheets

RADIOGRAPHIC SOURCE CONNECTOR WITH IMPROVED COUPLING MECHANISM

This application claims the benefit of U.S. Provisional Application No. 60/128,363 filed Apr. 8, 1999.

BACKGROUND OF THE INVENTION

1. Field of the Invention

This invention is related to an improved coupling mechanism for a radiographic source connector. More particularly, the coupling mechanism is directed to preventing inadvertent release of the connection.

2. Description of the Related Art

Radiographic systems are known for evaluating the condition of mechanical connections, e.g., welded connections in critical piping applications. In general, a radioactive source is located within the object to be evaluated at a point on the object where the evaluation is to be conducted. As an example, when the weld on a pipe is to be evaluated, a radioactive source is extended through the pipe to the weld under review, a photographic film or plate is provided adjacent to the weld such that the weld is between the plate and the radioactive source. The film is exposed for a predetermined amount of time and an image of the weld is thus created. The film is developed and the integrity of the weld is inspected.

Many systems are known for providing the radioactive source at the desired location. In general, a source wire is connected to a cable that is then extended through the conduit under examination. As shown in FIG. 1, a source assembly 10 includes a radioactive source capsule 12 at a distal end of a braided wire 16 with a connector assembly 14 coupled to a proximal end of the wire 16. The source assembly 10 is stored in a secure assembly to prevent inadvertent exposure of the user to radioactivity.

The source assembly 10 is retrieved from its housing by coupling a drive assembly 20, as shown in FIG. 2, to it. The drive assembly 20 includes a drive connector ball 22 attached to a drive wire 24 by a ball neck stem 25. The drive connector ball 22 couples to the connector assembly 14 and is then provided within the conduit being evaluated.

As shown in FIGS. 3A–3D, the connector assembly 14 includes a spring loaded up 30. The cup 30 is shaped to couple to the drive connector ball 22. A spring (not shown) within the connector assembly 14 urges the cup 30 toward a face F of the assembly 14. In the conventional system, the drive assembly 20 is able to move through approximately 90° of rotation relative to a central axis x—x (FIG. 1), due to a slot that is provided in the face F of the connector assembly 14.

It is known, however, that the coupling of the drive connector ball 22 to the connector assembly 14 using the spring loaded cup 30 may be prone to inadvertent detachment. In other words, while the drive connector ball 22 can only be inserted into the connector assembly 14 by pulling the spring loaded cup 30 out of position, i.e., away from the face F, it is possible for the drive connector ball 22 to disengage without pulling the spring loaded cup 30 out of position. The drive connector ball 22 disengages because the ball neck 25 pushes against the spring loaded cup 30 as the drive assembly 20 moves through the 90° of rotation. The ball neck 25 pushing against the spring loaded cup can occur when, for example, the radioactive source has been pushed outside of a conduit. In this situation, the radioactive source may be hanging down. When the source is retrieved it may catch an edge and become disengaged.

The inadvertent disconnecting of the source assembly 10 from the drive assembly 20 should be avoided at all costs. Such a disconnect means that the operator of the device has lost control over a radioactive source. In some instances, the source may be totally inaccessible and extreme measures would have to be taken to retrieve it. In other instances, the location of the radioactive source may not be discernable and therefore a dangerous condition exists in that a radioactive source is now lost and its whereabouts unknown.

Accordingly, a mechanism to reliably connect a radioactive source assembly to a drive assembly such that there is a 90° range of motion between the two and where the two can only be disconnected by deliberate action on the part of the operator is necessary.

SUMMARY OF THE INVENTION

The present invention provides a coupling mechanism that reliably connects a source assembly to a drive assembly. A source connector includes a sleeve that also has a sleeve slot for providing additional coupling to a drive connector ball. The drive assembly can still be moved through a 90° range of motion, however, it cannot be disconnected from the source assembly without overtly displacing the sleeve.

A coupling mechanism secures a source connector to a drive assembly to prevent unintentional release. The source connector includes a cup sleeve with a sleeve slot cut along its axis. The sleeve is spring-loaded to capture the ball end of a drive assembly by applying a positive locking force from the spring. The sleeve slot provides clearance for the neck of the ball end of the drive connector ball. This clearance allows the source connector to pivot approximately 90° without detaching from the drive cable. The source connector cannot be disconnected from the drive assembly due to a force applied in any direction. The only mechanism for release is to intentionally move the sleeve in a direction opposite the urging of the spring and then remove the drive connector ball.

BRIEF DESCRIPTION OF THE DRAWINGS

These and other advantages of the present invention will become more clearly known when the following specification is read in conjunction with the following figures.

DETAILED DESCRIPTION

Figure 1:
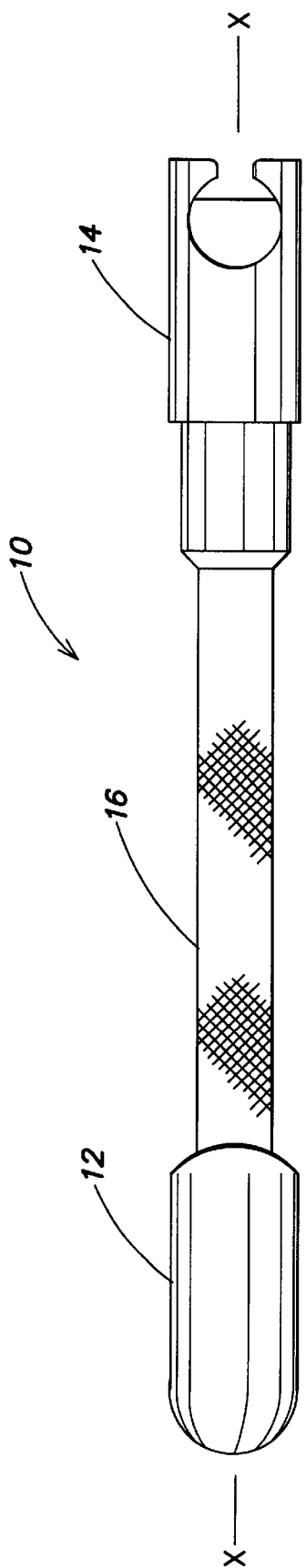
FIG. 1 is a conventional source assembly.
Figure 2:
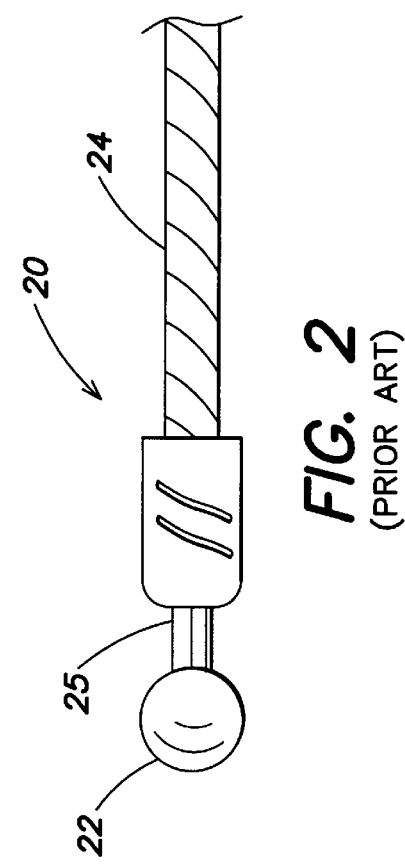
FIG. 2 is a conventional drive assembly.
Figure 3A:
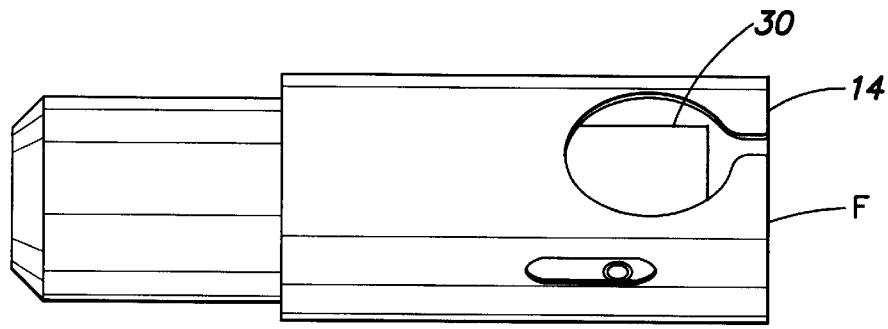
FIGS. 3A–3D are a representation of a conventional source assembly coupled to a conventional drive assembly.
Figure 3B:
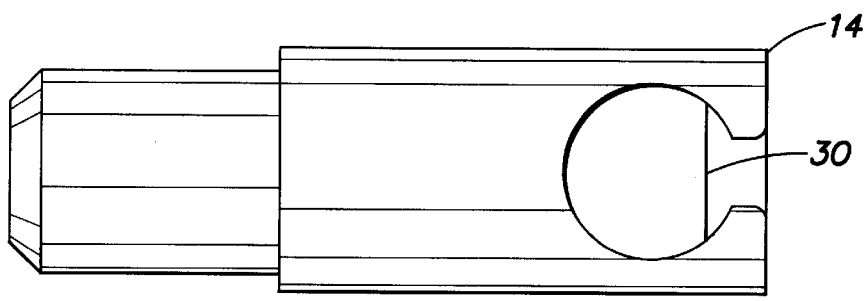
Figure 3C:
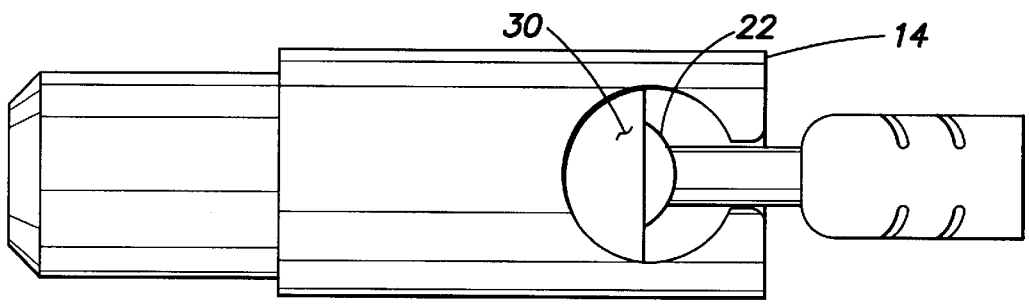
Figure 3D:
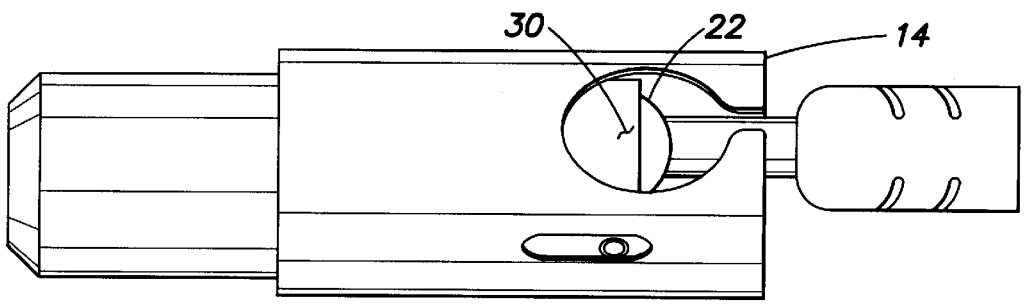
Figure 4:
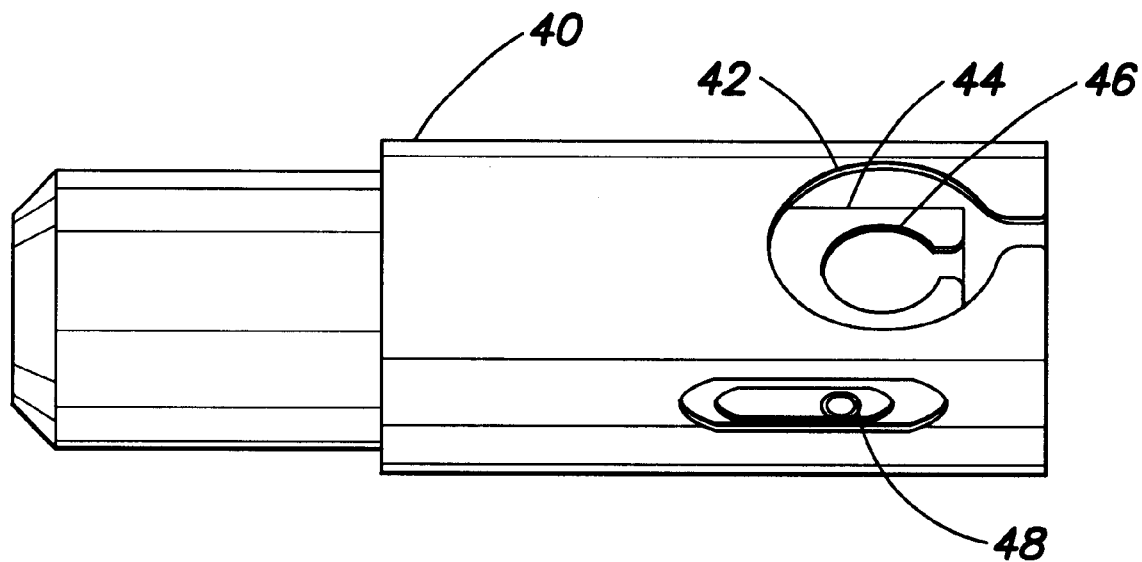
FIG. 4 is a source connector in accordance with a first embodiment of the present invention.

As shown in FIG. 4, a source connector 40 according to the present invention includes a source connector key slot 42 sized to receive the drive connector ball 22. Within the source connector 40, a movable sleeve 44 is provided that also includes a U-shaped sleeve slot 46. The sleeve 44 is connected to a roll pin 48. The roll pin 48 can be operated to move the sleeve 44 to receive the drive connector ball 22. The operation of the source connector 40 according to the present invention will be further explained below.

Figure 5A:
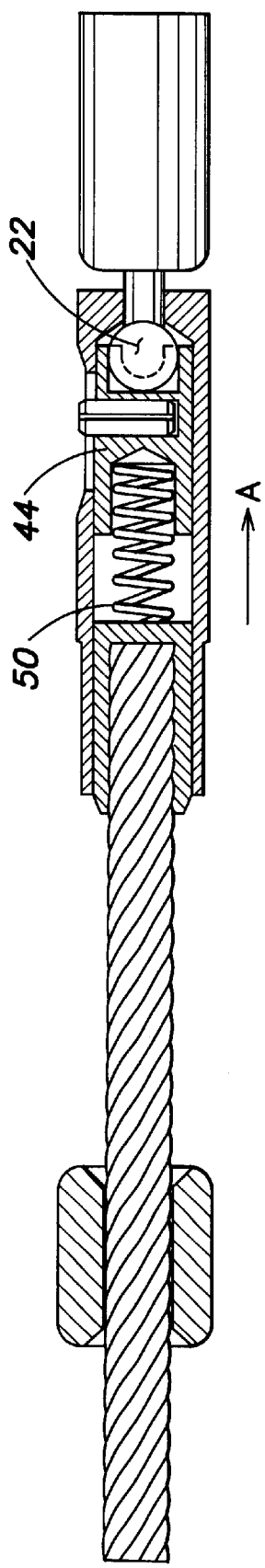
FIGS. 5A and 5B are schematic diagrams of the source connector of FIG. 4 coupled to a drive cable.
Figure 5B:
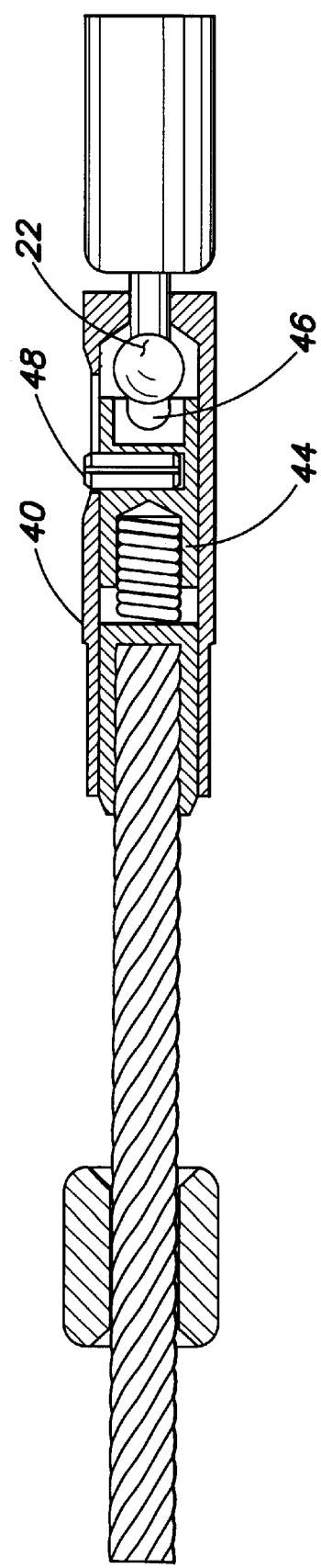

A compression spring 50 is provided within the source connector 40 to urge the sleeve 44 in a direction A toward an end of the source connector 40. As shown in FIG. 5A, the spring 50 causes the sleeve 44 to couple to the drive connector ball 22 in a locked position. Alternatively, by moving the roll pin 48 in a direction opposite to direction A, the sleeve 44 is moved into an unlocked position in which the drive connector ball 22 can be removed.

The sleeve slot 46 in the sleeve 44 captures the drive connector ball 22 to prevent it from inadvertently disconnecting from the source connector 40. The size of the source connector key slot 42 is chosen so that the drive connector ball 22 can be placed within it. The sleeve slot 46 has a smaller diameter than the source connector key slot 42 so that it must be pulled out of the way by manipulation of the roll pin 48 in order to allow entry of the drive connector ball 22. When, however, the sleeve is allowed back into its locked position due to the action of the compression spring 50, the sleeve slot 46 will engage the drive connector ball 22 and maintain its coupling to the source connector 40.

Figure 6:
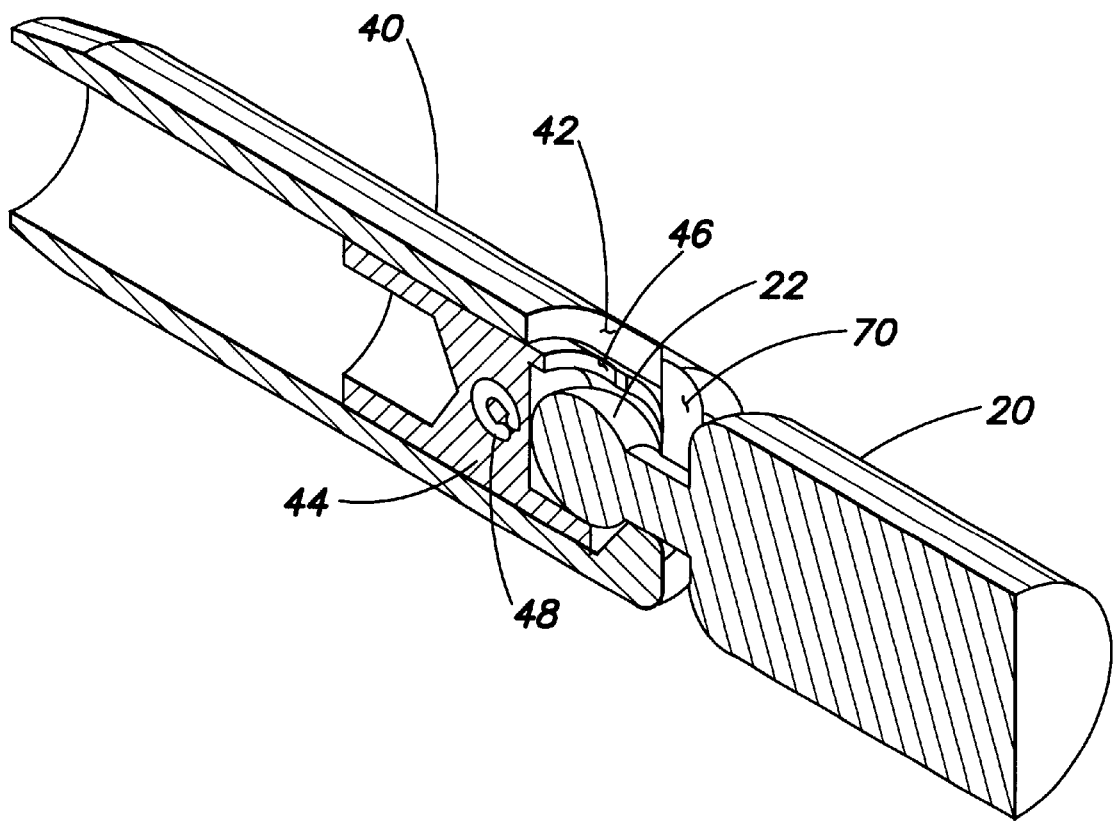
FIG. 6 is a sectional drawing of the assembly as shown in FIGS. 5A and 5B.

A cross-sectional view of the source connector 40 coupling to the drive assembly 20 is shown in FIG. 6. As can be seen, the sleeve 44 has a circular diameter to receive the drive connector ball 22 and includes the sleeve slot 46 through which the drive connector ball 22 is placed to couple with the sleeve 44.

Figure 7A:
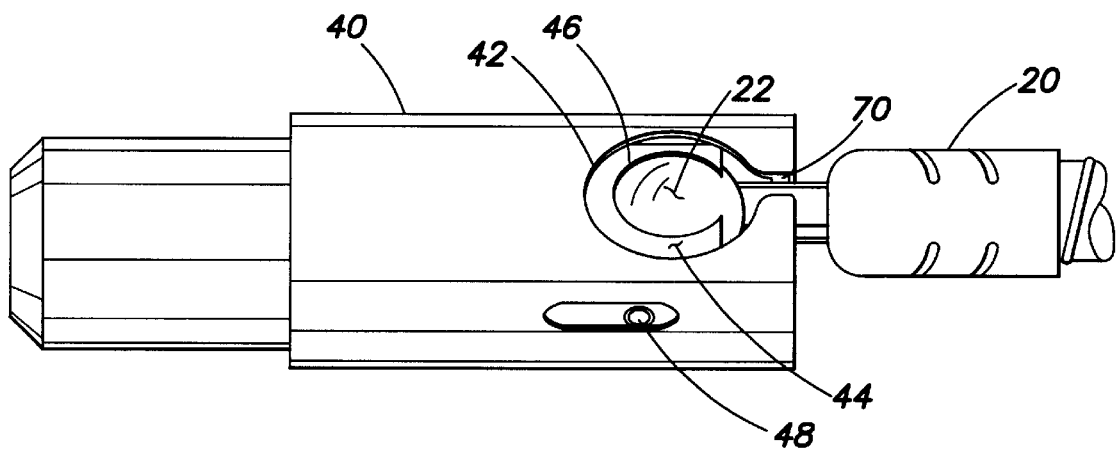
FIGS. 7A and 7B are schematic drawings of the source connector according to the present invention coupled to a drive assembly.
Figure 7B:
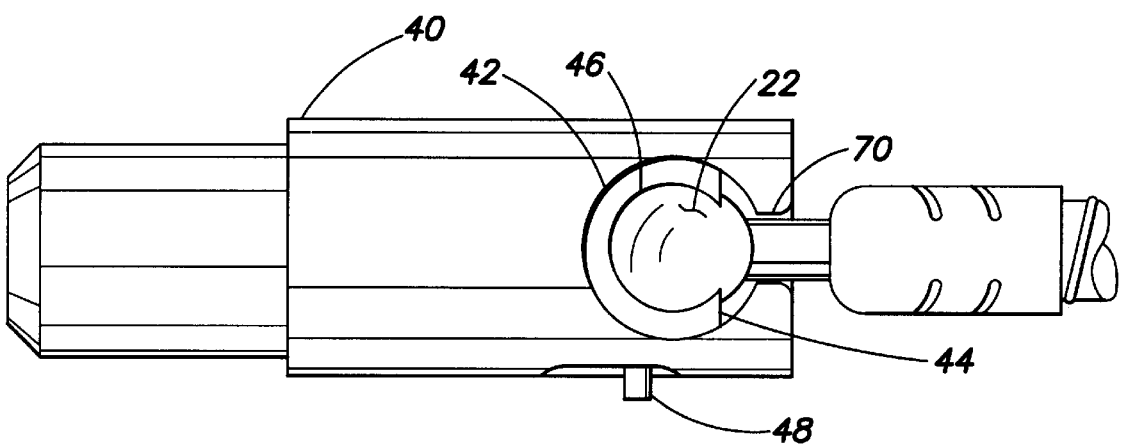
Figure 8A:
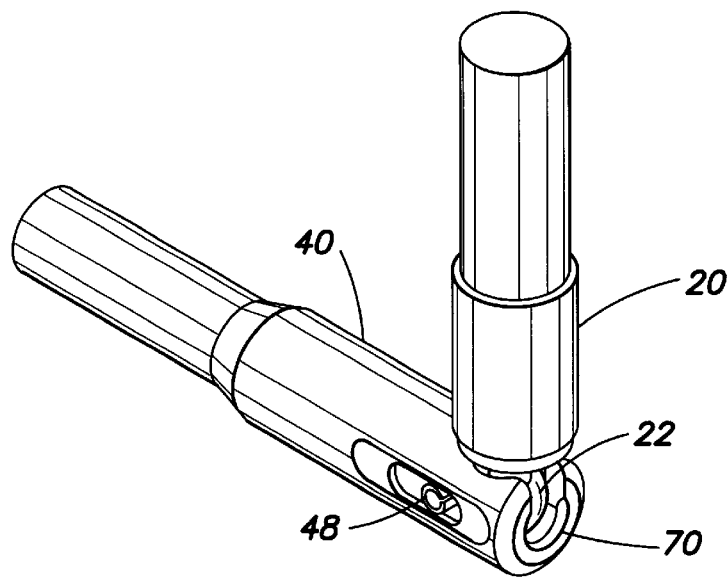
FIGS. 8A–8C are schematic diagrams of the source connector according to the present invention coupled to a drive assembly.
Figure 8B:
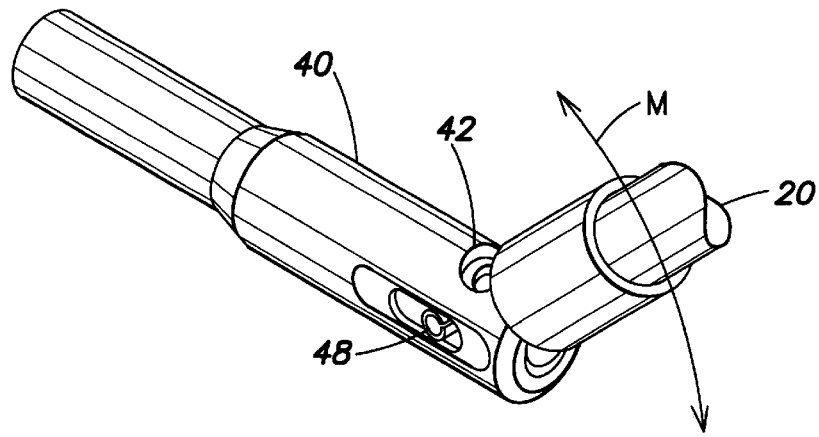
Figure 8C:
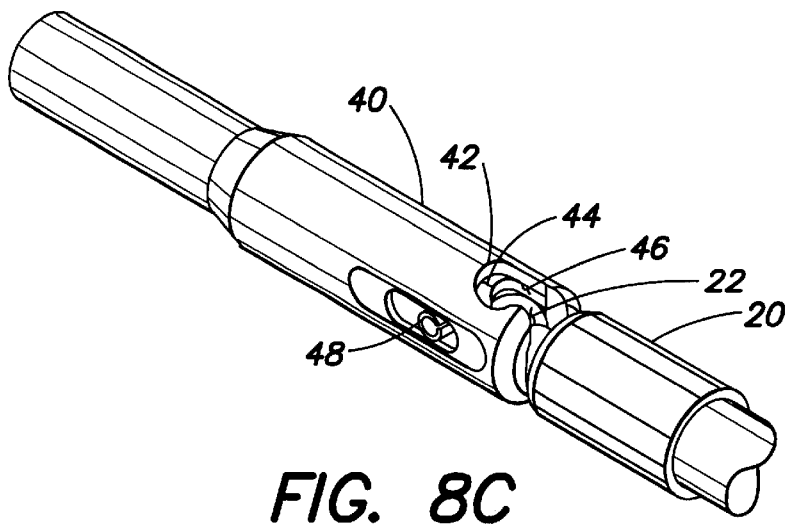

As shown in FIGS. 7A and 7B, the sleeve slot 46 of the sleeve 44 captures the drive connector ball 22 due to the force of the compression spring 50. As can be seen, an end of the source connector 40 includes a vertical slot 70 that allows the drive assembly 20 to pivot approximately 90°. FIGS. 8A–8C represent the drive assembly 20 as moving through a range of motion M.

The configuration of the sleeve slot 46 and the source connector key slot 42 allows the drive connection ball 22 to be inserted with the ball neck stem 25 oriented either parallel or perpendicular to the axis of the source connector 40. The ability to insert the drive connection ball 25 from two different orientations makes the operation of connecting and disconnecting easier.

Having thus described one embodiment of the present invention, various improvements, alterations and modifications may occur to those skilled in the art. Such improvements, alterations and modifications are intended to fall within the scope of the foregoing disclosure. Thus, the embodiment presented herein is provided by way of example only.

What is claimed is:

1. A radiographic source, comprising:

a source connector having two ends, a source connector key slot and a vertical slot defined at a first end portion thereof; and a sleeve disposed within the source connector, the sleeve having a sleeve slot defined therein and substantially aligned with the source connector key slot, wherein the sleeve slot is sized to be smaller than a size of the source connector key slot, and wherein at least a portion of tie vertical slot is substantially aligned with the ends of the source connector.

2. The radiographic source of claim 1, further comprising:
a spring to urge the sleeve toward the first end of the source connector.

3. The radiographic source of claim 2, further comprising:
a roll pin slot disposed in the source connector; and
a roll pin coupled to the sleeve,
wherein the roll pin is positioned to extend through the roll pin slot.

4. The radiographic source of claim 1, wherein:
the source connector is substantially cylindrical; and
the sleeve is substantially cylindrical.

5. The radiographic source of claim 1, wherein:
the source connector is substantially cylindrical;
the sleeve is substantially cylindrical; and
the sleeve slot is U-shaped.

6. A coupling apparatus for a radiographic source, comprising:

a source connector having two ends defining a longitudinal axis and a source connector key slot defined at a first end portion thereof;

a sleeve having a cup portion at a first end portion thereof, and a sleeve slot defined in the cup portion, the sleeve disposed within the source connector such that the sleeve slot is aligned with the source connector key slot, and a passage extending from the cup portion through the first end portion of the source connector in a direction along the longitudinal axis.

7. The coupling apparatus of claim 6, wherein the sleeve slot is sized to be smaller than a size of the source connector slot.

8. The coupling apparatus of claim 6, further comprising:
a spring disposed within the source connector to urge the sleeve toward the first end of the source connector.

9. The coupling apparatus of claim 6, wherein:
the source connector is substantially cylindrical; and
the sleeve is substantially cylindrical.

10. The coupling apparatus of claim 7, further comprising:
a spring disposed within the source connector to urge the sleeve toward the first end of the source connector.

11. The coupling apparatus of claim 7, wherein:
the source connector is substantially cylindrical; and
the sleeve is substantially cylindrical.

12. The coupling apparatus of claim 6, further comprising:
the source connector is substantially cylindrical; and
the sleeve is substantially cylindrical.

13. The coupling apparatus of claim 6, wherein the sleeve slot is U-shaped.

14. A coupling apparatus for a radiographic source, comprising:

a source connector having a source connector key slot defined at a first end portion thereof, the source connector having two ends defining a longitudinal axis, and a transverse axis substantially perpendicular to the longitudinal axis;

a sleeve disposed to be movable relative to the source, connector, the sleeve having a cup portion at a first end portion thereof, and a sleeve slot defined in the cup portion and substantially aligned with the source connector key slot in a direction along the transverse axis; and a passage extending from the cup portion through the first end portion of the source connector in a direction along the longitudinal axis, wherein the sleeve slot, source connector key slot and passage are arranged to receive a drive connector with an extension such that in at least one position the extension is alignable with the longitudinal axis.

15. A coupling apparatus for a radiographic source, comprising;

a source connector having two ends defining a longitudinal axis and a transverse axis substantially perpendicular to the longitudinal axis, the source connector having a drive connector receiving cavity at a first end portion, a source connector key slot at the first end portion extending from the drive connector receiving cavity through a side wall of the source connector in a direction along the transverse axis, and an end slot extending from the drive connector receiving cavity through the first end in a direction along the longitudinal axis; and a sleeve disposed to be moveable relative to the source connector, the sleeve having a sleeve slot defined therein and substantially aligned with the source connector key slot, wherein the drive connector receiving cavity is arranged to receive a drive connector with an extension such that in at least one position the extension is alignable with the longitudinal axis by extending through the end slot.

* * * * *

UNITED STATES PATENT AND TRADEMARK OFFICE
CERTIFICATE OF CORRECTION

PATENT NO.    : 6,481,914 B1
DATED         : November 19, 2002
INVENTOR(S)   : Grenier et al.

It is certified that error appears in the above-identified patent and that said Letters Patent is hereby corrected as shown below:

Column 3,
Line 66, replace "tie" with -- the --.

Column 4,
Line 59, replace "source," with -- source --.

Signed and Sealed this

Twenty-seventh Day of May, 2003

JAMES E. ROGAN
*Director of the United States Patent and Trademark Office*